US012478882B2

(12) United States Patent
Sanchez et al.

(10) Patent No.: US 12,478,882 B2
(45) **Date of Patent: *Nov. 25, 2025**

(54) SYSTEMS AND METHODS FOR PRESENTING SHARED IN-GAME OBJECTIVES IN VIRTUAL GAMES

(71) Applicant: QUANATA, LLC, San Francisco, CA (US)

(72) Inventors: Kenneth Jason Sanchez, San Francisco, CA (US); Micah Wind Russo, Oakland, CA (US)

(73) Assignee: QUANATA, LLC, San Francisco, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 18/304,520

(22) Filed: Apr. 21, 2023

(65) Prior Publication Data

US 2023/0256343 A1 Aug. 17, 2023

Related U.S. Application Data

(63) Continuation of application No. 17/404,172, filed on Aug. 17, 2021, now Pat. No. 11,697,069.

(51) Int. Cl.

*A63F 13/803* (2014.01)
*A63F 13/655* (2014.01)
*A63F 13/798* (2014.01)
*A63F 13/847* (2014.01)

(52) U.S. Cl.

CPC .......... *A63F 13/655* (2014.09); *A63F 13/798* (2014.09); *A63F 13/803* (2014.09); *A63F 13/847* (2014.09)

(58) Field of Classification Search

None

See application file for complete search history.

(56) References Cited

U.S. PATENT DOCUMENTS

| | | | |
|---|---|---|---|
| 6,726,567 | B1 | 4/2004 | Khosla |
| 7,278,920 | B1 | 10/2007 | Klamer et al. |
| 8,645,029 | B2 | 2/2014 | Kim et al. |
| 8,799,035 | B2 | 8/2014 | Coleman et al. |
| 9,140,567 | B2 | 9/2015 | Fryer et al. |
| 9,327,189 | B2 | 5/2016 | Bavitz et al. |

(Continued)

*Primary Examiner* — Tramar Harper

(74) *Attorney, Agent, or Firm* — BRYAN CAVE LEIGHTON PAISNER LLP

(57) ABSTRACT

Method and system for presenting in-game objectives in a virtual game. For example, the method includes determining first real-world driving characteristics based upon first real-world telematics data of a first real-world user, determining second real-world driving characteristics based upon second real-world telematics data of a second real-world user, generating a shared virtual map based upon the first real-world driving characteristics and the second real-world driving characteristics, generating a shared in-game objective based upon the shared virtual map, presenting the shared in-game objective to a first virtual character associated with the first real-world driving characteristics of the first real-world user and a second virtual character associated with the second real-world driving characteristics of the second real-world user, and allowing the first virtual character and the second virtual character to accomplish the shared in-game objective in the shared virtual map.

21 Claims, 5 Drawing Sheets

(56) References Cited

U.S. PATENT DOCUMENTS 9,352,216 B2 5/2016 Mullen
9,381,426 B1 7/2016 Hughes et al.
9,473,893 B2 10/2016 Kuramura et al.
9,478,150 B1 10/2016 Fields et al.
9,498,704 B1 11/2016 Cohen et al.
9,643,089 B2 * 5/2017 Ishikawa ................. A63F 13/65
9,691,298 B1 * 6/2017 Hsu-Hoffman ...... G09B 19/167
9,786,170 B2 10/2017 Roy et al.
9,858,832 B1 * 1/2018 Hsu-Hoffman ....... A63F 13/803
9,916,693 B1 3/2018 Carr et al.
9,943,754 B2 4/2018 Prasad et al.
10,013,883 B2 7/2018 Farnham, IV et al.
10,086,287 B2 10/2018 Krietzman et al.
10,282,911 B2 5/2019 Carr et al.
10,369,472 B1 8/2019 Mattar et al.
10,384,130 B2 8/2019 Parisi
10,403,043 B2 9/2019 Kaufman et al.
10,430,745 B2 10/2019 Rani et al.
10,521,983 B1 * 12/2019 Hsu-Hoffman ........ G07C 5/008
10,557,715 B2 2/2020 Caldas et al.
10,603,591 B1 3/2020 Navulur
10,681,181 B2 6/2020 Hamill
10,713,543 B1 7/2020 Skuin et al.
10,723,312 B1 7/2020 Potter et al.
10,737,184 B2 8/2020 Baszucki
10,775,179 B1 9/2020 Hayward
10,782,699 B2 9/2020 Tao et al.
10,788,332 B2 9/2020 Deluca et al.
10,832,593 B1 * 11/2020 Dahl .................... G09B 19/167
10,916,075 B1 2/2021 Webster et al.
11,504,622 B1 * 11/2022 Sanchez .................. A63F 13/65
2001/0006908 A1 7/2001 Fujioka et al.
2002/0028704 A1 3/2002 Bloomfield et al.
2002/0070916 A1 6/2002 Noro et al.
2002/0075286 A1 6/2002 Yonezawa et al.
2002/0082068 A1 6/2002 Singhal
2002/0082082 A1 6/2002 Stamper et al.
2002/0090985 A1 7/2002 Tochner et al.
2002/0198055 A1 12/2002 Bull et al.
2003/0062675 A1 4/2003 Noro et al.
2003/0144047 A1 7/2003 Sprogis
2003/0224855 A1 12/2003 Cunningham
2004/0005927 A1 1/2004 Bonilla et al.
2004/0046655 A1 3/2004 Benes et al.
2004/0058732 A1 3/2004 Piccionelli
2004/0224740 A1 11/2004 Ball et al.
2004/0248653 A1 12/2004 Barros et al.
2005/0009608 A1 1/2005 Robarts et al.
2005/0049022 A1 3/2005 Mullen
2006/0105838 A1 5/2006 Mullen
2006/0154710 A1 7/2006 Serafat
2006/0258420 A1 11/2006 Mullen
2007/0281765 A1 12/2007 Mullen
2007/0281766 A1 12/2007 Mullen
2007/0296723 A1 12/2007 Williams
2008/0015018 A1 1/2008 Mullen
2008/0015024 A1 1/2008 Mullen
2008/0081694 A1 4/2008 Hong et al.
2008/0280684 A1 11/2008 Mcbride et al.
2008/0309675 A1 12/2008 Fleury et al.
2009/0005140 A1 1/2009 Rose et al.
2009/0076784 A1 3/2009 Ong et al.
2010/0227688 A1 * 9/2010 Lee ......................... A63F 13/71 463/31
2010/0271367 A1 10/2010 Vaden et al.
2011/0212766 A1 9/2011 Bowers et al.
2011/0319148 A1 * 12/2011 Kinnebrew ............ G06V 20/42 463/43
2012/0069131 A1 3/2012 Abelow
2012/0142273 A1 * 6/2012 Ozaki ................. H04M 1/6091 455/66.1
2012/0142429 A1 * 6/2012 Muller .................... A63F 13/69 463/42
2013/0182116 A1 7/2013 Arima
2014/0125678 A1 5/2014 Wang et al.
2014/0128146 A1 5/2014 Story et al.
2014/0129130 A1 5/2014 Kuramura et al.
2014/0180725 A1 * 6/2014 Ton-That ............... G06Q 10/10 705/4
2014/0195106 A1 7/2014 Mcquade et al.
2014/0195272 A1 * 7/2014 Sadiq ..................... G06Q 40/08 705/4
2014/0347368 A1 * 11/2014 Kishore ................. G01C 21/20 701/538
2014/0364238 A1 12/2014 Koh et al.
2015/0011315 A1 1/2015 Sofman et al.
2015/0081404 A1 3/2015 Basir
2015/0112504 A1 4/2015 Binion et al.
2015/0112540 A1 4/2015 Rutkowski et al.
2015/0120408 A1 * 4/2015 Liu .................... G06Q 30/0209 705/14.12
2015/0178998 A1 6/2015 Attard et al.
2015/0212722 A1 7/2015 Leung et al.
2015/0310758 A1 10/2015 Daddona et al.
2016/0003636 A1 1/2016 Ng-Thow-Hing et al.
2016/0003836 A1 1/2016 Stauber et al.
2016/0084661 A1 3/2016 Gautama et al.
2016/0219024 A1 7/2016 Verzun et al.
2017/0061733 A1 3/2017 Gulla et al.
2017/0259177 A1 9/2017 Aghdaie et al.
2017/0323244 A1 11/2017 Rani et al.
2018/0126277 A1 * 5/2018 Yan ......................... A63F 13/25
2018/0286268 A1 10/2018 Ni
2018/0322700 A1 11/2018 Carr et al.
2018/0350144 A1 12/2018 Rathod
2018/0352282 A1 * 12/2018 Lin .................... H04N 21/4781
2019/0096134 A1 3/2019 Amacker et al.
2019/0265703 A1 8/2019 Hicok et al.
2020/0013306 A1 1/2020 Mcquade et al.
2020/0104326 A1 4/2020 Ricci
2020/0139250 A1 5/2020 Curtis et al.
2020/0286253 A1 9/2020 Chilcote-Bacco
2020/0334762 A1 10/2020 Carver et al.
2020/0391104 A1 12/2020 Nakamura et al.
2021/0346805 A1 11/2021 Daniali
2022/0242450 A1 8/2022 Sokolov et al.
2022/0284077 A1 * 9/2022 Dahl .................... G09B 29/106

* cited by examiner

SYSTEMS AND METHODS FOR PRESENTING SHARED IN-GAME OBJECTIVES IN VIRTUAL GAMES

CROSS-REFERENCE TO RELATED APPLICATIONS

This application is a continuation of U.S. patent application Ser. No. 17/404,172, titled "Systems and Methods for Presenting Shared In-Game Objectives in Virtual Games," filed Aug. 17, 2021, the entire disclosure of which is incorporated by reference herein in its entirety.

Reference is made to the following six previously-filed applications, all of which are hereby incorporated by reference in their entirety for all purposes:

1. U.S. patent application Ser. No. 17/404,139, titled "Systems and Methods for Generating Virtual Characters for a Virtual Game";
2. U.S. patent application Ser. No. 17/404,144, titled "Systems and Methods for Generating Virtual Experiences for a Virtual Game";
3. U.S. patent application Ser. No. 17/404,152, titled "Systems and Methods for Generating Virtual Encounters in Virtual Games";
4. U.S. patent application Ser. No. 17/404,158, titled "Systems and Methods for Generating Virtual Maps in Virtual Games";
5. U.S. patent application Ser. No. 17/404,164, titled "Systems and Methods for Generating Shared Virtual Maps in Virtual Games"; and
6. U.S. patent application Ser. No. 17/404,172, titled "Systems and Methods for Presenting Shared In-Game Objectives in Virtual Games".

FIELD OF THE DISCLOSURE

Some embodiments of the present disclosure are directed to presenting shared in-game objectives in a virtual game. More particularly, certain embodiments of the present disclosure provide methods and systems for generating the shared in-game objectives based at least in part upon a shared virtual map. Merely by way of example, the present disclosure has been applied to presenting the shared in-game objectives to virtual characters associated with different users to accomplish in the shared virtual map. But it would be recognized that the present disclosure has much broader range of applicability.

BACKGROUND OF THE DISCLOSURE

While individuals generally exercise care while operating vehicles, it is still challenging for many vehicle operators to fully appreciate the risks associated with vehicle operations. As such, many vehicle operators may not be readily mindful of reducing such risks. Hence, it is highly desirable to develop new technologies that can increase a vehicle operator's appreciation and awareness of the risks posed by vehicle operation.

BRIEF SUMMARY OF THE DISCLOSURE

Some embodiments of the present disclosure are directed to presenting shared in-game objectives in a virtual game. More particularly, certain embodiments of the present disclosure provide methods and systems for generating the shared in-game objectives based at least in part upon a shared virtual map. Merely by way of example, the present disclosure has been applied to presenting the shared in-game objectives to virtual characters associated with different users to accomplish in the shared virtual map. But it would be recognized that the present disclosure has much broader range of applicability.

According to certain embodiments, a method for presenting one or more in-game objectives in one or more virtual games includes receiving first real-world telematics data associated with one or more prior first real-world vehicle trips made by a first real-world user and determining one or more first real-world driving characteristics based at least in part upon the first real-world telematics data. Also, the method includes receiving second real-world telematics data associated with one or more prior second real-world vehicle trips made by a second real-world user and determining one or more second real-world driving characteristics based at least in part upon the second real-world telematics data. The first real-world user is different from the second real-world user. Further, the method includes generating a shared virtual map based at least in part upon the one or more first real-world driving characteristics and the one or more second real-world driving characteristics. The method then includes processing information associated with the shared virtual map. Additionally, the method includes generating a shared in-game objective based at least in part upon the shared virtual map and presenting the shared in-game objective to a first virtual character and a second virtual character in a virtual game. The first virtual character is associated with the one or more first real-world driving characteristics of the first real-world user while the second virtual character is associated with the one or more second real-world driving characteristics of the second real-world user. The first virtual character and the second virtual character are different. Moreover, the method includes allowing the first virtual character and the second virtual character to accomplish, in the shared virtual map, the shared in-game objective.

According to some embodiments, a computing device for presenting one or more in-game objectives in one or more virtual games includes one or more processors and a memory that stores instructions for execution by the one or more processors. The instructions, when executed, cause the one or more processors to receive first real-world telematics data associated with one or more prior first real-world vehicle trips made by a first real-world user and determine one or more first real-world driving characteristics based at least in part upon the first real-world telematics data. Also, the instructions, when executed, cause the one or more processors to receive second real-world telematics data associated with one or more prior second real-world vehicle trips made by a second real-world user and determine one or more second real-world driving characteristics based at least in part upon the second real-world telematics data. The first real-world user is different from the second real-world user. Further, the instructions, when executed, cause the one or more processors to generate a shared virtual map based at least in part upon the one or more first real-world driving characteristics and the one or more second real-world driving characteristics. The instructions, when executed, then cause the one or more processors to process information associated with the shared virtual map. Additionally, the instructions, when executed, then cause the one or more processors to generate a shared in-game objective based at least in part upon the shared virtual map and present the shared in-game objective to a first virtual character and a second virtual character in a virtual game. The first virtual character is associated with the one or more first real-world driving characteristics of the first real-world user while the second virtual character is associated with the one or more second real-world driving characteristics of the second real-world user. The first virtual character and the second virtual character are different. Moreover, the instructions, when executed, then cause the one or more processors to allow the first virtual character and the second virtual character to accomplish, in the shared virtual map, the shared in-game objective.

According to certain embodiments, a non-transitory computer-readable medium stores instructions for presenting one or more in-game objectives in one or more virtual games. The instructions are executed by one or more processors of a computing device. The non-transitory computer-readable medium includes instructions to receive first real-world telematics data associated with one or more prior first real-world vehicle trips made by a first real-world user and determine one or more first real-world driving characteristics based at least in part upon the first real-world telematics data. Also, the non-transitory computer-readable medium includes instructions to receive second real-world telematics data associated with one or more prior second real-world vehicle trips made by a second real-world user and determine one or more second real-world driving characteristics based at least in part upon the second real-world telematics data. The first real-world user is different from the second real-world user. Further, the non-transitory computer-readable medium includes instructions to generate a shared virtual map based at least in part upon the one or more first real-world driving characteristics and the one or more second real-world driving characteristics. The non-transitory computer-readable medium then includes instructions to process information associated with the shared virtual map. Additionally, the non-transitory computer-readable medium includes instructions to generate a shared in-game objective based at least in part upon the shared virtual map and present the shared in-game objective to a first virtual character and a second virtual character in a virtual game. The first virtual character is associated with the one or more first real-world driving characteristics of the first real-world user while the second virtual character is associated with the one or more second real-world driving characteristics of the second real-world user. The first virtual character and the second virtual character are different. Moreover, the non-transitory computer-readable medium includes instructions to allow the first virtual character and the second virtual character to accomplish, in the shared virtual map, the shared in-game objective.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to presenting shared in-game objectives in a virtual game. More particularly, certain embodiments of the present disclosure provide methods and systems for generating the shared in-game objectives based at least in part upon a shared virtual map. Merely by way of example, the present disclosure has been applied to presenting the shared in-game objectives to virtual characters associated with different users to accomplish in the shared virtual map. But it would be recognized that the present disclosure has much broader range of applicability.

Figure 1A:
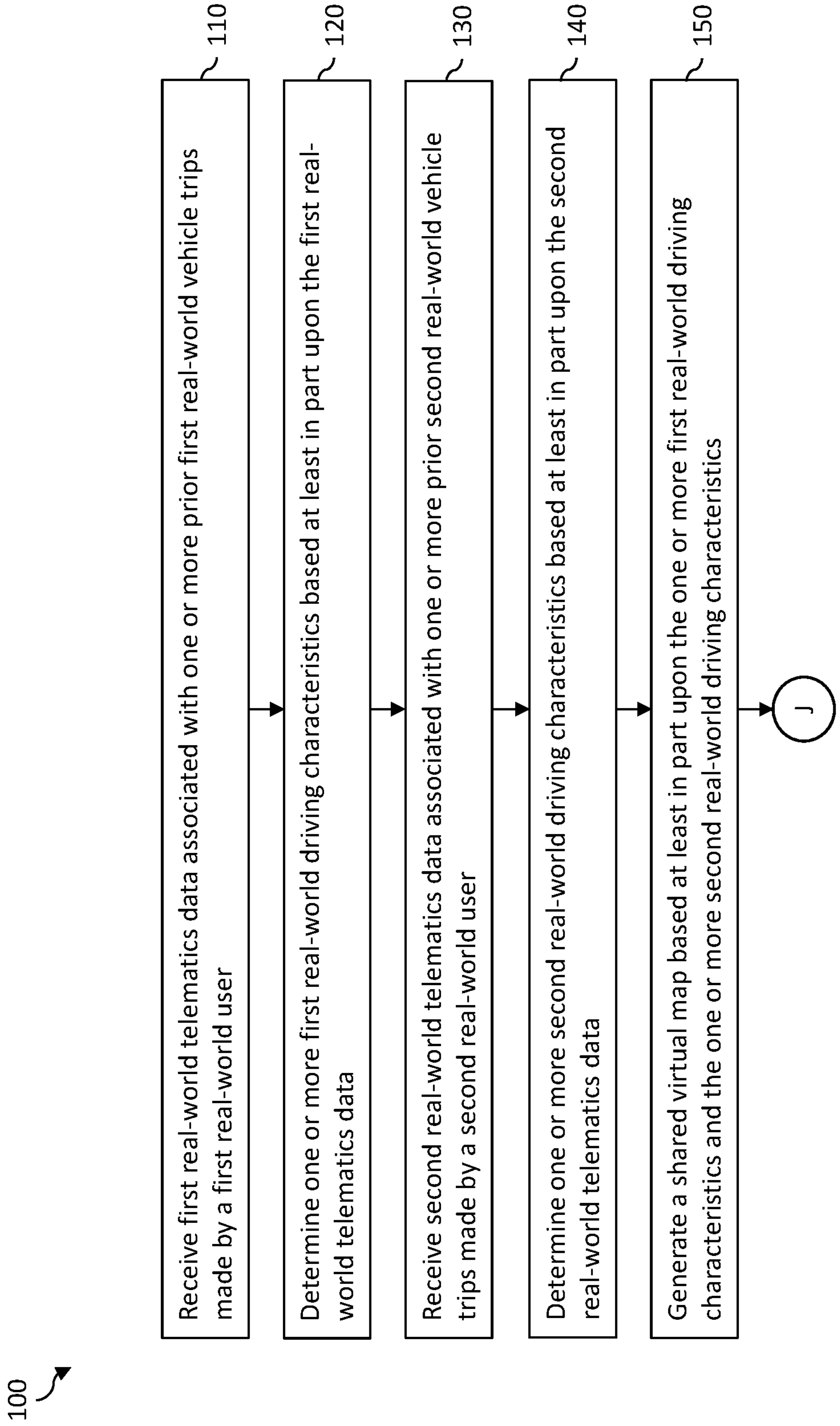
FIG. 1A and FIG. 1B show a simplified method for presenting shared in-game objectives in virtual games according to certain embodiments of the present disclosure.
Figure 1B:
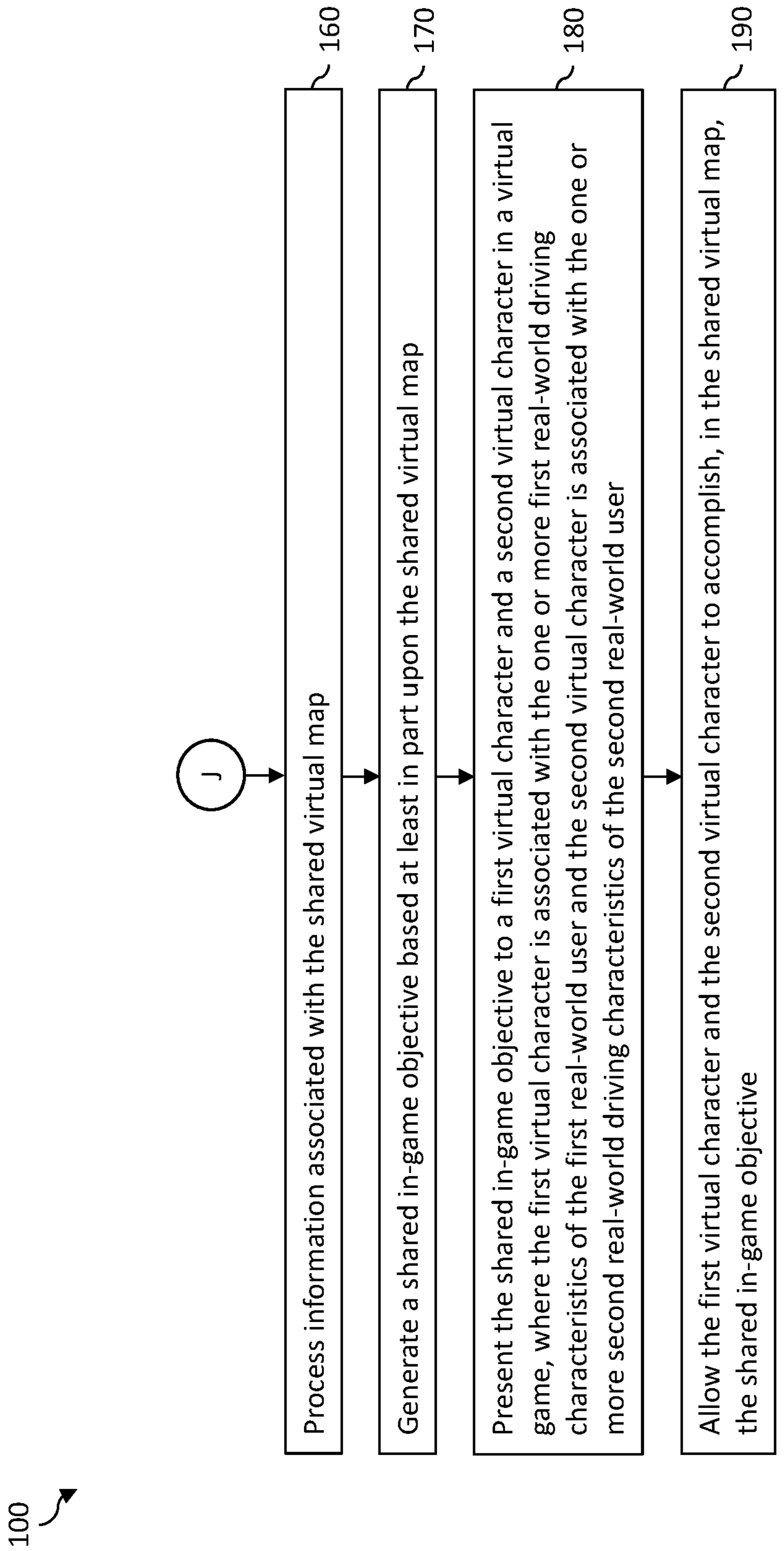

I. One or More Methods for Presenting Shared In-Game Objectives in Virtual Games According to Certain Embodiments FIG. 1A and FIG. 1B show a simplified method for presenting shared in-game objectives in virtual games according to certain embodiments of the present disclosure. The figures are merely examples, which should not unduly limit the scope of the claims. One of ordinary skill in the art would recognize many variations, alternatives, and modifications. The method 100 includes process 110 for receiving first real-world data from a first real-world user, process 120 for determining first real-world driving characteristics, process 130 for receiving second real-world data from a second real-world user, process 140 for determining second real-world driving characteristics, process 150 for generating a shared virtual map, process 160 for processing the shared virtual map, process 170 for generating a shared in-game objective, process 180 for presenting the shared in-game objective, and process 190 for allowing the shared in-game objective to be accomplished. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 110, first real-world telematics data associated with one or more prior first real-world vehicle trips made by the first real-world user are received according to some embodiments. In various embodiments, the first real-world user is a real-world driver of a first real-world vehicle. In certain embodiments, the one or more prior first real-world vehicle trips correspond to actual vehicle trips that the first real-world user has made in the past. For example, the one or more prior first real-world vehicle trips include actual vehicle trips made by the first real-world user for any personal and/or business reasons (e.g., commuting to work, grocery shopping, going to a bank, road trips, etc.).

In some embodiments, the first real-world telematics data are collected from one or more sensors associated with the first real-world vehicle operated by the first real-world user. For example, the one or more sensors include any type and number of accelerometers, gyroscopes, magnetometers, barometers, location sensors (e.g., GPS sensors), tilt sensors, yaw rate sensors, brake sensors, airbag deployment sensors, windshield wiper sensors, headlight sensors, steering angle sensors, gear position sensors, proximity detectors, throttle sensors, gas tank sensors, battery sensors, etc. As an example, the first real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, etc. In certain embodiments, the first real-world telematics data indicate the operational state of the first real-world vehicle, such as speed, acceleration, braking event, etc. In some embodiments, the one or more sensors are part of or located in the first real-world vehicle. For example, the one or more sensors communicate and store sensor data in an electronic control module (ECM) or an engine control unit (ECU) of the first real-world vehicle. In certain embodiments, the one or more sensors are part of a computing device (e.g., a mobile device, a smart watch) that is connected to the first real-world vehicle. For example, the computing device is connected to the first real-world vehicle while the first real-world vehicle is in operation. As an example, the computing device is connected to the first real-world vehicle while the first real-world vehicle is stationary.

At the process 120, one or more first real-world driving characteristics are determined based at least in part upon the first real-world telematics data according to certain embodiments. In various embodiments, the one or more first real-world driving characteristics indicate how the first real-world user drives, such as how frequently the first real-world user drives, type of maneuvers that the first real-world user makes while driving (e.g., hard cornering, hard braking, sudden acceleration, smooth acceleration, slowing before turning, etc.), types of dangerous driving events (e.g., eating while driving, falling asleep while driving, etc.), types of safe driving events (e.g., maintaining safe following distance, turning on headlights, observing traffic lights, yielding to pedestrians, etc.), etc.

In some embodiments, the one or more first real-world driving characteristics refer to one or more driving skills of the first real-world user. For example, the one or more first real-world driving characteristics include a first braking characteristic, a first steering characteristic, a first speeding characteristic, and/or a first focus characteristic. As an example, the first braking characteristic corresponds to the first real-world user's ability to decelerate the first real-world vehicle upon encountering braking obstacles (e.g., T-junctions, stop signs, pedestrian crossings, etc.). For example, the first steering characteristic corresponds to the first real-world user's ability to steer the first real-world vehicle upon encountering steering obstacles (e.g., potholes, road kills, sharp turns, etc.). As an example, the first speeding characteristic corresponds to the first real-world user's ability to decelerate the first real-world vehicle upon encountering speeding obstacles (e.g., approaching a school zone, entering city limit, etc.). For example, the first focus characteristic corresponds to the first real-world user's ability to maintain or regain focus while operating the first real-world vehicle upon encountering focus obstacles (e.g., using a cell phone while driving).

In certain embodiments, the one or more first real-world driving characteristics include one or more first driving attributes associated with the first real-world user. For example, the one or more first driving attributes may include a first driving alertness (e.g., how attentive is the first real-world user while driving), a first driving reaction time (e.g., how fast can the first real-world user react to a given driving situation), a first driving risk-taking (e.g., how likely is the first real-world user to engage in risky driving behavior), a first driving information processing (e.g., how well can the first real-world user interpret inputs from driving environment), a first driving endurance (e.g., how long can the first real-world user drive without rest), and/or other suitable driving traits attributable to the first real-world user.

At the process 130, second real-world telematics data and second real-world geolocation data associated with one or more prior second real-world vehicle trips made by the second real-world user are received according to some embodiments. In various embodiments, the second real-world user is a real-world driver of a second real-world vehicle, and the second real-world user is different from the first real-world user. In certain embodiments, the one or more prior second real-world vehicle trips correspond to actual vehicle trips that the second real-world user has made in the past. For example, the one or more prior second real-world vehicle trips include actual vehicle trips made by the second real-world user for any personal and/or business reasons (e.g., going to the pharmacy, picking up kids from school, dropping off packages at the post office, etc.).

In some embodiments, the second real-world telematics data and/or the second real-world geolocation data are collected from one or more sensors associated with the second real-world vehicle operated by the second real-world user. For example, the one or more sensors include any type and number of accelerometers, gyroscopes, magnetometers, barometers, location sensors (e.g., GPS sensors), tilt sensors, yaw rate sensors, brake sensors, airbag deployment sensors, windshield wiper sensors, headlight sensors, steering angle sensors, gear position sensors, proximity detectors, throttle sensors, gas tank sensors, battery sensors, etc. As an example, the second real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, etc. In certain embodiments, the second real-world telematics data indicate the operational state of the second real-world vehicle. In some embodiments, the one or more sensors are part of or located in the second real-world vehicle. For example, the one or more sensors communicate and store sensor data in an ECM or ECU of the second real-world vehicle. In certain embodiments, the one or more sensors are part of a computing device that is connected to the second real-world vehicle. For example, the computing device is connected to the second real-world vehicle while the second real-world vehicle is in operation. As an example, the computing device is connected to the second real-world vehicle while the second real-world vehicle is stationary.

At the process 140, one or more second real-world driving characteristics are determined based at least in part upon the second real-world telematics data according to some embodiments. In various embodiments, the one or more second real-world driving characteristics indicate how the second real-world user drives, such as how frequently the second real-world user drives, type of maneuvers that the second real-world user makes while driving, types of dangerous driving events, types of safe driving events, etc.

In certain embodiments, the one or more second real-world driving characteristics refer to one or more driving skills of the second real-world user. For example, the one or more second real-world driving characteristics include a second braking characteristic, a second steering characteristic, a second speeding characteristic, and/or a second focus characteristic. As an example, the second braking characteristic corresponds to the second real-world user's ability to decelerate the second real-world vehicle upon encountering braking obstacles. For example, the second steering characteristic corresponds to the second real-world user's ability to steer the second real-world vehicle upon encountering steering obstacles. As an example, the second speeding characteristic corresponds to the second real-world user's ability to decelerate the second real-world vehicle upon encountering speeding obstacles. For example, the second focus characteristic corresponds to the second real-world user's ability to maintain or regain focus while operating the second real-world vehicle upon encountering focus obstacles.

In certain embodiments, the one or more second real-world driving characteristics include one or more second driving attributes associated with the second real-world user. For example, the one or more second driving attributes may include a second driving alertness (e.g., how attentive is the second real-world user while driving), a second driving reaction time (e.g., how fast can the second real-world user react to a given driving situation), a second driving risk-taking (e.g., how likely is the second real-world user to engage in risky driving behavior), a second driving information processing (e.g., how well can the second real-world user interpret inputs from driving environment), a second driving endurance (e.g., how long can the second real-world user drive without rest), and/or other suitable driving traits attributable to the second real-world user.

At the process 150, the shared virtual map is generated based at least in part upon the one or more first real-world driving characteristics and the one or more second real-world driving characteristics according to some embodiments. In various embodiments, a network of virtual roads is generated in the shared virtual map based at least in part upon a combination of the one or more first real-world driving characteristics and the one or more second real-world driving characteristics. For example, the combination of the one or more first real-world driving characteristics and the one or more second real-world driving characteristics indicates that both the first real-world user and the second real-world user brake frequently while driving. As an example, the network of virtual roads would include virtual road intersections that correspond to an averaged frequency of braking by the first real-world user and the second real-world user. For example, the combination of the one or more first real-world driving characteristics and the one or more second real-world driving characteristics indicates that the first real-world user makes sharp turns while driving and the second real-world user makes smooth turns while driving. As an example, the network of virtual roads would include virtual roads with a variety of curves/bends that correspond to the sharp turns made by the first real-world user as well as virtual roads with little or no curves/bends that correspond to the smooth turns made by the second real-world user.

In certain embodiments, the network of virtual roads is generated based at least in part upon the geolocations of the first real-world vehicle and the second real-world vehicle. For example, the first real-world user is operating the first real-world vehicle in an urban setting and the second real-world user is operating the second real-world vehicle in a rural setting. As an example, the network of virtual roads would include virtual city streets or highways that correspond to the urban setting as well as virtual country roads that correspond to the rural setting.

In some embodiments, the shared virtual map includes landmarks that the first real-world user and the second real-world user have visited while operating their respective real-world vehicles. For example, the shared virtual map shows virtual bridges corresponding to real-world bridges, virtual buildings corresponding to real-world buildings, virtual parks corresponding to real-world parks, virtual tunnels corresponding to real-world tunnels, virtual stadiums corresponding to real-world stadiums, virtual museums corresponding to real-world museums, etc.

At the process 160, information associated with the shared virtual map are processed according to certain embodiments. In various embodiments, processing the information includes determining characteristics of the shared virtual map such as a size of the shared virtual map, boundaries on the shared virtual map, virtual characters using the shared virtual map, etc.

At the process 170, the shared in-game objective is generated based at least in part upon the shared virtual map according to certain embodiments. In various embodiments, the shared in-game objective is a task that needs to be completed in the shared virtual map. For example, the shared virtual map includes a virtual monster and the shared in-game objective is to defeat the virtual monster. As an example, the shared virtual map includes a virtual element (e.g., a virtual treasure) and the shared in-game objective to capture or claim ownership of the virtual element. For example, the shared virtual map includes various virtual foes (e.g., virtual zombies) and the shared in-game objective is to destroy as many of the virtual foes as possible. As an example, the shared virtual map includes a virtual competition (e.g., a virtual race) and the shared in-game objective is to win the virtual competition.

At the process 180, the shared in-game objective is presented to a first virtual character and a second virtual character in a virtual game according to some embodiments. For example, the shared in-game objective is presented in a remote display (e.g., in a mobile device of the first real-world user and a mobile device of the second real-world user). In various embodiments, the first virtual character is associated with the one or more first real-world driving characteristics of the first real-world user and the second virtual character is associated with the one or more second real-world driving characteristics of the second real-world user. In certain embodiments, the virtual game simulates a virtual driving environment in which the first virtual character operates a first virtual vehicle and the second virtual character operates a second virtual vehicle. For example, the first virtual character exists as a playable character that the first real-world user can control to operate the first virtual vehicle in the shared virtual map. As an example, the second virtual character exists as a playable character that the second real-world user can control to operate the second virtual vehicle in the shared virtual map.

At the process 190, the first virtual character and the second virtual character are allowed to accomplish the shared in-game objective in the shared virtual map according to certain embodiments. In some embodiments, accomplishing the shared in-game objective entails determining whether the first virtual character and the second virtual character have accomplished the shared in-game objective in the shared virtual map by satisfying respective virtual performance conditions (e.g., whether the first virtual character has satisfied one or more first virtual performance conditions and whether the second virtual character has satisfied one or more second virtual performance conditions). For example, if the one or more first virtual performance conditions are determined to be not satisfied by the first virtual character, then the first virtual character and the second virtual character are determined to have not accomplished the shared in-game objective in the shared virtual map. As an example, if the one or more second virtual performance conditions are determined to be not satisfied by the second virtual character, then the first virtual character and the second virtual character are determined to have not accomplished the shared in-game objective in the shared virtual map. For example, if the one or more first virtual performance conditions are determined to be satisfied by the first virtual character and the one or more second virtual performance conditions have been determined to be satisfied by the second virtual character, then the first virtual character and the second virtual character are determined to have accomplished the shared in-game objective in the shared virtual map.

In certain embodiments, accomplishing the shared in-game objective entails determining whether the first virtual character and the second virtual character have accomplished the shared in-game objective in the shared virtual map by collectively satisfying one or more virtual performance conditions. In various embodiments, the one or more virtual performance conditions include the one or more first virtual performance conditions and/or the one or more second virtual performance conditions. For example, if the one or more virtual performance conditions are determined to be collectively satisfied by the first virtual character and the second virtual character, then the first virtual character and the second virtual character are determined to have accomplished the shared in-game objective in the shared virtual map. As an example, if the one or more virtual performance conditions are determined to be not collectively satisfied by the first virtual character and the second virtual character, then the first virtual character and the second virtual character are determined to have not accomplished the shared in-game objective in the shared virtual map.

In some embodiments, satisfying the one or more first virtual performance conditions relates to the first virtual character achieving certain levels of virtual driving skills. For example, the first virtual character needs to achieve a certain score (e.g., a score of 4 out of 5) for a first virtual braking skill, a first virtual steering skill, a first virtual speeding skill, a first virtual focus skill, a first virtual alertness, a first virtual reaction time, a first virtual risk-taking, a first virtual information processing, and/or a first virtual endurance. In various embodiments, the first virtual braking skill is based at least in part upon the first braking characteristic, the first virtual steering skill is based at least in part upon the first steering characteristic, the first virtual speeding skill is based at least in part upon the first speeding characteristic, the first virtual focus skill is based at least in part upon the first focus characteristic, the first virtual alertness is based at least in part upon the first driving alertness, the first virtual reaction time is based at least in part upon the first driving reaction time, the first virtual risk-taking is based at least in part upon the first driving risk-taking, the first virtual information processing is based at least in part upon the first driving information processing, and the first virtual endurance is based at least in part upon the first driving endurance.

In certain embodiments, satisfying the one or more second virtual performance conditions relates to the second virtual character achieving certain levels of virtual driving skills. For example, the second virtual character needs to achieve a certain score (e.g., a score of 4 out of 5) for a second virtual braking skill, a second virtual steering skill, a second virtual speeding skill, a second virtual focus skill, a second virtual alertness, a second virtual reaction time, a second virtual risk-taking, a second virtual information processing, and/or a second virtual endurance. In various embodiments, the second virtual braking skill is based at least in part upon the second braking characteristic, the second virtual steering skill is based at least in part upon the second steering characteristic, the second virtual speeding skill is based at least in part upon the second speeding characteristic, the second virtual focus skill is based at least in part upon the second focus characteristic, the second virtual alertness is based at least in part upon the second driving alertness, the second virtual reaction time is based at least in part upon the second driving reaction time, the second virtual risk-taking is based at least in part upon the second driving risk-taking, the second virtual information processing is based at least in part upon the second driving information processing, and the second virtual endurance is based at least in part upon the second driving endurance.

In some embodiments, the one or more first virtual performance conditions are the same as the one or more second virtual performance conditions. For example, the both the first virtual character and the second virtual character need to achieve a certain score for the first virtual braking skill and the second virtual braking skill. In certain embodiments, the one or more first virtual performance conditions are different from the one or more second virtual performance conditions. For example, the first virtual character needs to achieve a certain score for the first virtual steering skill while the second virtual character needs to achieve a certain score for the second virtual reaction time.

In various embodiments, the shared virtual map and the shared in-game objective are generated based upon any suitable number of users. For example, the real-world driving characteristics associated with N users used to generate the shared virtual map which in turn is used to generate the shared in-game objective for the N users.

In certain embodiments, instead of the virtual driving environment, the virtual game simulates a virtual role-playing environment. For example, the shared virtual map presented in the virtual role-playing environment depicts virtual paths (e.g., virtual trails, virtual rivers, virtual mountain passes, etc.). As an example, the shared in-game objective is for the first virtual character and the second virtual character to complete a quest in the shared virtual map. For example, to successfully complete the quest, the one or more first virtual performance conditions relating to the first virtual character achieving certain levels of virtual driving skills and/or the one or more second virtual performance conditions relating to the second virtual character achieving certain levels of virtual driving skills need to be satisfied.

In some embodiments, instead of the virtual driving environment, the virtual game simulates a virtual battle environment. For example, the shared virtual map presented in the virtual battle environment depicts virtual battlefields. As an example, the shared in-game objective is for the first virtual character and the second virtual character to fight in a battle (e.g., against each other or against a common enemy). For example, to successfully fight in the battle, the one or more first virtual performance conditions relating to the first virtual character achieving certain levels of virtual driving skills and/or the one or more second virtual performance conditions relating to the second virtual character achieving certain levels of virtual driving skills need to be satisfied.

As discussed above and further emphasized here, FIG. 1A and FIG. 1B are merely examples, which should not unduly limit the scope of the claims. One of ordinary skill in the art would recognize many variations, alternatives, and modifications. In some examples, at the process 110, in addition to the first real-world telematics data, data from video or photographic capturing devices are also received. For example, the video or photographic capturing devices may be utilized to capture images internally or externally to the first real-world vehicle to determine the one or more first real-world driving characteristics and/or conditions surrounding the first real-world vehicle. In certain examples, at the process 130, in addition to the second real-world telematics data, data from video or photographic capturing devices are also received. For example, the video or photographic capturing devices may be utilized to capture images internally or externally to the second real-world vehicle to determine the one or more second real-world driving characteristics and/or conditions surrounding the second real-world vehicle.

Figure 2:
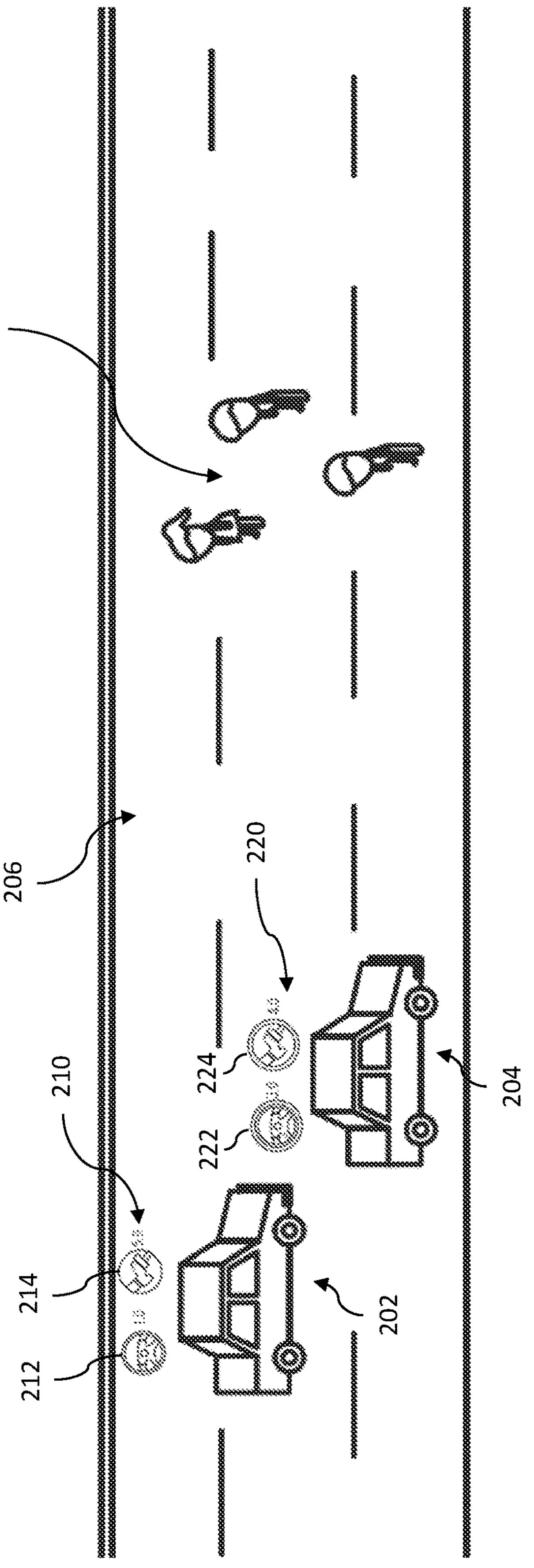
FIG. 2 shows a simplified diagram illustrating a shared in-game objective according to certain embodiments of the present disclosure.

FIG. 2 shows a simplified diagram illustrating a shared in-game objective that is presented by the method 100 as shown in FIG. 1A and FIG. 1B according to certain embodiments of the present disclosure. The figure is merely an example, which should not unduly limit the scope of the claims. One of ordinary skill in the art would recognize many variations, alternatives, and modifications.

In some embodiments where the virtual driving environment is simulated in the virtual game, the shared in-game objective that has been generated by the method 100 is to be completed by the virtual characters while operating respective virtual vehicles. For example, a first virtual vehicle 202 operated by the first virtual character and a second virtual vehicle 204 operated by the second virtual character are traveling on a virtual route 206. As an example, the shared in-game objective is to destroy as many virtual zombies 208 as possible that are blocking the virtual route 206. For example, to accomplish the shared in-game objective, the first virtual character operating the first virtual vehicle 202 needs to satisfy a set of virtual performance conditions 210 in the form of achieving a passable score (e.g., 6 out of 10) for a first virtual steering skill 212 and a first virtual braking skill 214. As an example, the first virtual character has only achieved a score of 1 out of 10 for the first virtual steering skill 212 and a score of 5 out of 10 for the first virtual braking skill 214. For example, to accomplish the shared in-game objective, the second virtual character in the second virtual vehicle 204 needs to satisfy a set of virtual performance conditions 220 in the form of achieving a passable score (e.g., 6 out of 10) for a second virtual steering skill 222 and a second virtual braking skill 224. As an example, the second virtual character has only achieved a score of 3 out of 10 for the second virtual steering skill 222 and a score of 4 out of 10 for the second virtual braking skill 224.

Figure 3:
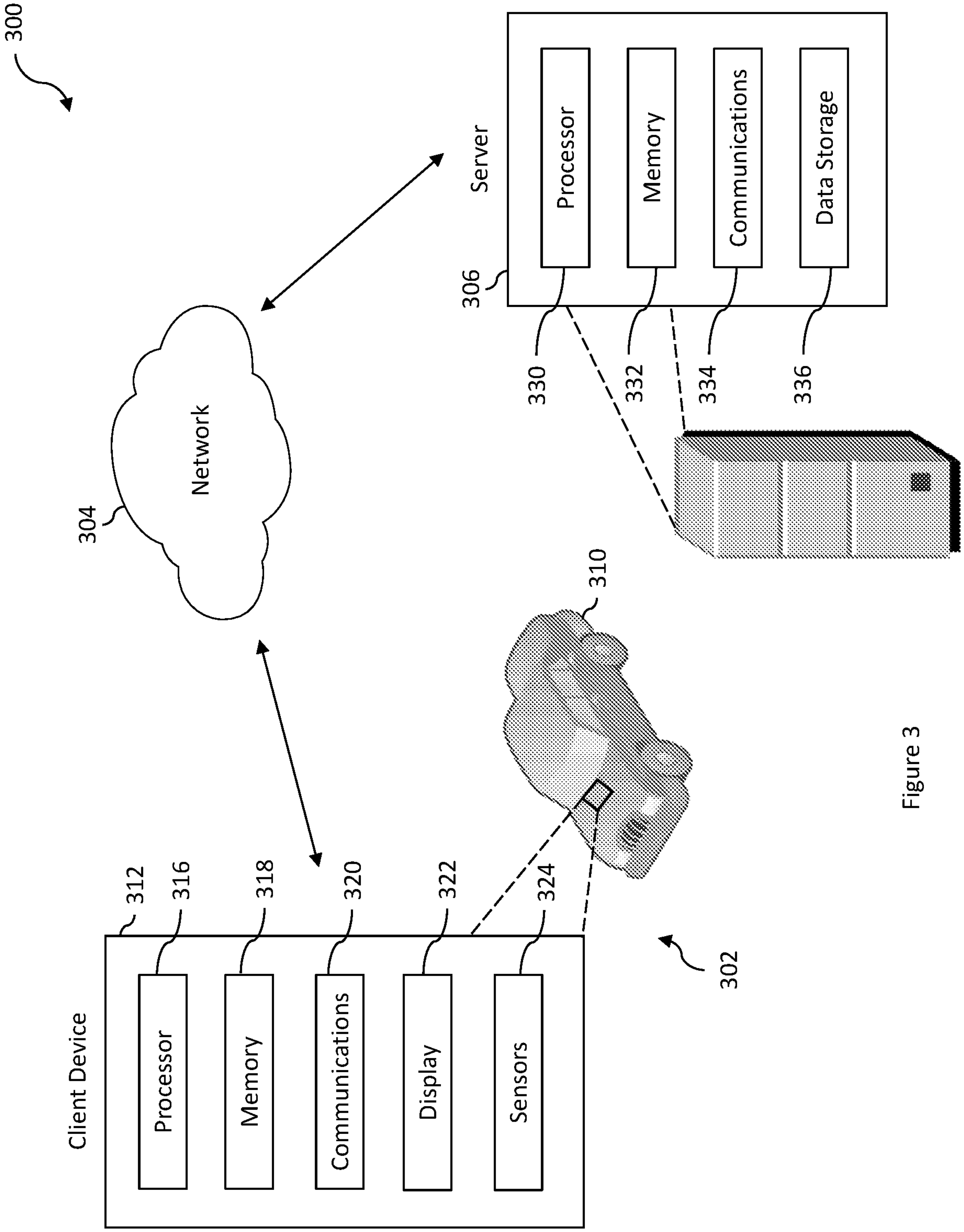
FIG. 3 shows a simplified system for presenting shared in-game objectives in virtual games according to certain embodiments of the present disclosure.

II. One or More Systems for Presenting Shared In-Game Objectives in Virtual Games According to Certain Embodiments FIG. 3 shows a simplified system for presenting shared in-game objectives in virtual games according to certain embodiments of the present disclosure. The figure is merely an example, which should not unduly limit the scope of the claims. One of ordinary skill in the art would recognize many variations, alternatives, and modifications. The system 300 includes a vehicle system 302, a network 304, and a server 306. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 300 is used to implement the method 100. According to certain embodiments, the vehicle system 302 includes a vehicle 310 and a client device 312 associated with the vehicle 310. For example, the client device 312 is an on-board computer embedded or located in the vehicle 310. As an example, the client device 312 is a mobile device (e.g., a smartphone) that is connected (e.g., via wired or wireless links) to the vehicle 310. As an example, the client device 312 includes a processor 316 (e.g., a central processing unit (CPU), a graphics processing unit (GPU)), a memory 318 (e.g., random-access memory (RAM), read-only memory (ROM), flash memory), a communications unit 320 (e.g., a network transceiver), a display unit 322 (e.g., a touchscreen), and one or more sensors 324 (e.g., an accelerometer, a gyroscope, a magnetometer, a barometer, a GPS sensor). In certain embodiments, the client device 312 represents the on-board computer in the vehicle 310 and the mobile device connected to the vehicle 310. For example, the one or more sensors 324 may be in the vehicle 310 and in the mobile device connected to the vehicle 310.

In some embodiments, the vehicle 310 is operated by a real-world user, such as the first real-world user and/or the second real-world user. In certain embodiments, multiple vehicles 310 exist in the system 300 which are operated by respective users. For example, the first real-world user operates the first real-world vehicle and the second real-world user operates the second real-world vehicle.

In various embodiments, during vehicle trips, the one or more sensors 324 monitor the vehicle 310 by collecting data associated with various operating parameters of the vehicle, such as speed, acceleration, braking, location, and other suitable parameters. In certain embodiments, the collected data include telematics data. According to some embodiments, the data are collected continuously, at predetermined time intervals, and/or based on a triggering event (e.g., when each sensor has acquired a threshold amount of sensor measurements). In various embodiments, the collected data represent the first real-world telematics data and/or the second real-world telematics data in the method 100.

According to certain embodiments, the collected data are stored in the memory 318 before being transmitted to the server 306 using the communications unit 320 via the network 304 (e.g., via a local area network (LAN), a wide area network (WAN), the Internet). In some embodiments, the collected data are transmitted directly to the server 306 via the network 304. For example, the collected data are transmitted to the server 306 without being stored in the memory 318. In certain embodiments, the collected data are transmitted to the server 306 via a third party. For example, a data monitoring system stores any and all data collected by the one or more sensors 324 and transmits those data to the server 306 via the network 304 or a different network.

According to some embodiments, the server 306 includes a processor 330 (e.g., a microprocessor, a microcontroller), a memory 332, a communications unit 334 (e.g., a network transceiver), and a data storage 336 (e.g., one or more databases). In some embodiments, the server 306 is a single server, while in certain embodiments, the server 306 includes a plurality of servers with distributed processing. In FIG. 3, the data storage 336 is shown to be part of the server 306. In certain embodiments, the data storage 336 is a separate entity coupled to the server 306 via a network such as the network 304. In some embodiments, the server 306 includes various software applications stored in the memory 332 and executable by the processor 330. For example, these software applications include specific programs, routines, or scripts for performing functions associated with the method 100. As an example, the software applications include general-purpose software applications for data processing, network communication, database management, web server operation, and/or other functions typically performed by a server.

According to various embodiments, the server 306 receives, via the network 304, the data collected by the one or more sensors 324 using the communications unit 334 and stores the data in the data storage 336. For example, the server 306 then processes the data to perform one or more processes of the method 100.

According to certain embodiments, any related information determined or generated by the method 100 (e.g., real-world driving characteristics, shared in-game objectives, shared virtual maps, etc.) are transmitted back to the client device 312, via the network 304, to be provided (e.g., displayed) to the user via the display unit 322.

In some embodiments, one or more processes of the method 100 are performed by the client device 312. For example, the processor 316 of the client device 312 processes the data collected by the one or more sensors 324 to perform one or more processes of the method 100.

Figure 4:
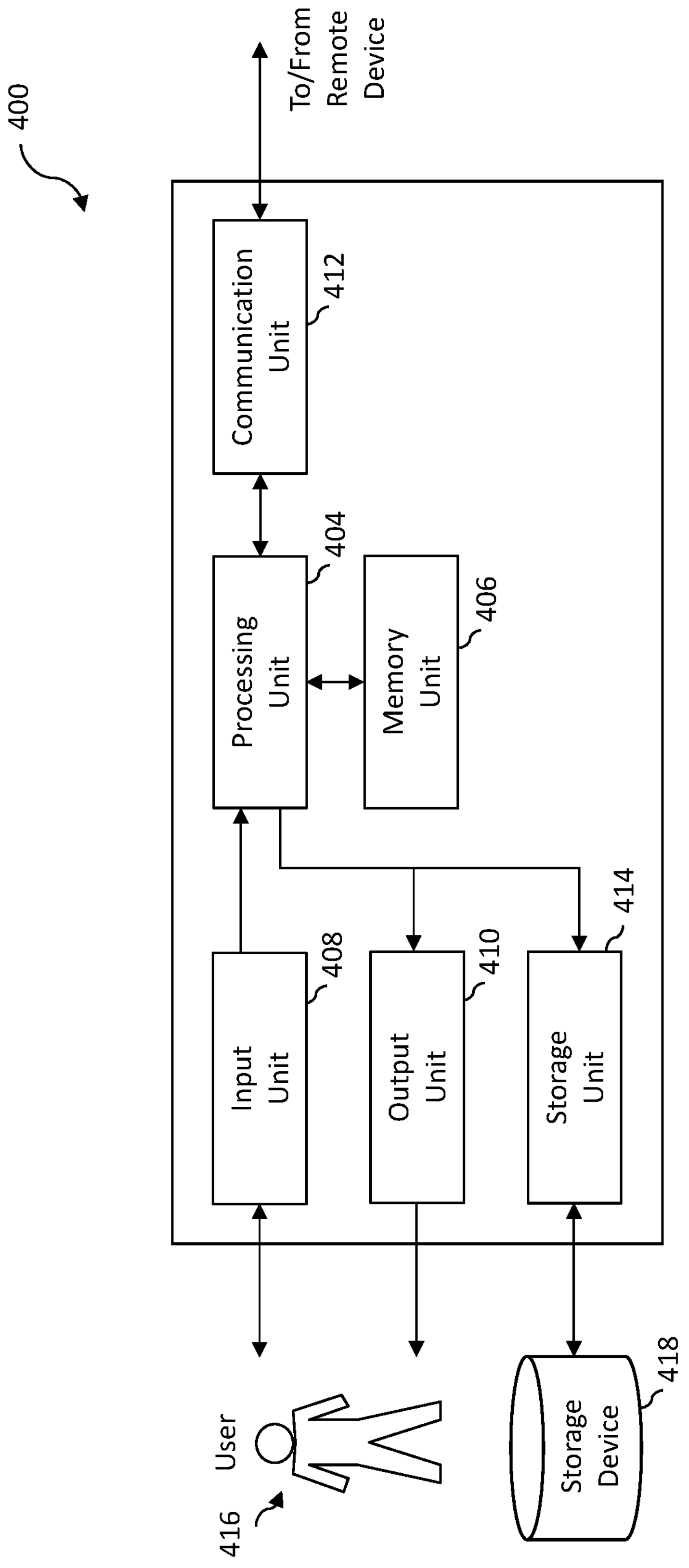
FIG. 4 shows a simplified computing device for presenting shared in-game objectives in virtual games according to certain embodiments of the present disclosure.

III. One or More Computing Devices for Presenting Shared In-Game Objectives in Virtual Games According to Certain Embodiments FIG. 4 shows a simplified computing device for presenting shared in-game objectives in virtual games according to certain embodiments of the present disclosure. The figure is merely an example, which should not unduly limit the scope of the claims. One of ordinary skill in the art would recognize many variations, alternatives, and modifications. The computing device 400 includes a processing unit 404, a memory unit 406, an input unit 408, an output unit 410, a communication unit 412, and a storage unit 414. In various embodiments, the computing device 400 is configured to be in communication with a user 416 and/or a storage device 418. In certain embodiments, the computing device 400 includes the client device 312 and/or the server 306 of FIG. 3. In some embodiments, the computing device 400 is configured to implement the method 100 of FIG. 1A and/or FIG. 1B. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the processing unit 404 is configured for executing instructions, such as instructions to implement the method 100 of FIG. 1A and/or FIG. 1B. In some embodiments, the executable instructions are stored in the memory unit 406. In certain embodiments, the processing unit 404 includes one or more processing units (e.g., in a multi-core configuration). In some embodiments, the processing unit 404 includes and/or is communicatively coupled to one or more modules for implementing the methods and systems described in the present disclosure. In certain embodiments, the processing unit 404 is configured to execute instructions within one or more operating systems. In some embodiments, upon initiation of a computer-implemented method, one or more instructions is executed during initialization. In certain embodiments, one or more operations is executed to perform one or more processes described herein. In some embodiments, an operation may be general or specific to a particular programming language (e.g., C, C++, Java, or other suitable programming languages, etc.).

In various embodiments, the memory unit 406 includes a device allowing information, such as executable instructions and/or other data to be stored and retrieved. In some embodiments, the memory unit 406 includes one or more computer readable media. In certain embodiments, the memory unit 406 includes computer readable instructions for providing a user interface, such as to the user 416, via the output unit 410. In some embodiments, a user interface includes a web browser and/or a client application. For example, a web browser enables the user 416 to interact with media and/or other information embedded on a web page and/or a website. In certain embodiments, the memory unit 406 includes computer readable instructions for receiving and processing an input via the input unit 408. In some embodiments, the memory unit 406 includes RAM such as dynamic RAM (DRAM) or static RAM (SRAM), ROM, erasable programmable read-only memory (EPROM), electrically erasable programmable read-only memory (EEPROM), and/or non-volatile RAM (NVRAM).

In various embodiments, the input unit 408 is configured to receive input (e.g., from the user 416). In some embodiments, the input unit 408 includes a keyboard, a pointing device, a mouse, a stylus, a touch sensitive panel (e.g., a touch pad or touch screen), a gyroscope, an accelerometer, a position sensor (e.g., GPS sensor), and/or an audio input device. In certain embodiments, the input unit 408 is configured to function as both an input unit and an output unit.

In various embodiments, the output unit 410 includes a media output unit configured to present information to the user 416. In some embodiments, the output unit 410 includes any component capable of conveying information to the user 416. In certain embodiments, the output unit 410 includes an output adapter such as a video adapter and/or an audio adapter. For example, the output unit 410 is operatively coupled to the processing unit 404 and/or a visual display device to present information to the user 416 (e.g., a liquid crystal display (LCD), a light emitting diode (LED) display, an organic light emitting diode (OLED) display, a cathode ray tube (CRT) display, a projected display, etc.). As an example, the output unit 410 is operatively coupled to the processing unit 404 and/or an audio display device to present information to the user 416 (e.g., a speaker arrangement or headphones).

In various embodiments, the communication unit 412 is configured to be communicatively coupled to a remote device. In some embodiments, the communication unit 412 includes a wired network adapter, a wireless network adapter, a wireless data transceiver for use with a mobile phone network (e.g., 3G, 4G, 5G, Bluetooth, near-field communication (NFC), etc.), and/or other mobile data networks. In certain embodiments, other types of short-range or long-range networks may be used. In some embodiments, the communication unit 412 is configured to provide email integration for communicating data between a server and one or more clients.

In various embodiments, the storage unit 414 is configured to enable communication between the computing device 400 and the storage device 418. In some embodiments, the storage unit 414 is a storage interface. For example, the storage interface is any component capable of providing the processing unit 404 with access to the storage device 418. In certain embodiments, the storage unit 414 includes an advanced technology attachment (ATA) adapter, a serial ATA (SATA) adapter, a small computer system interface (SCSI) adapter, a RAID controller, a SAN adapter, a network adapter, and/or any other component capable of providing the processing unit 404 with access to the storage device 418.

In various embodiments, the storage device 418 includes any computer-operated hardware suitable for storing and/or retrieving data. In certain embodiments, the storage device 418 is integrated in the computing device 400. In some embodiments, the storage device 418 includes a database such as a local database or a cloud database. In certain embodiments, the storage device 418 includes one or more hard disk drives. In some embodiments, the storage device 418 is external and is configured to be accessed by a plurality of server systems. In certain embodiments, the storage device 418 includes multiple storage units such as hard disks or solid state disks in a redundant array of inexpensive disks configuration. In some embodiments, the storage device 418 includes a storage area network and/or a network attached storage system.

IV. Examples of Certain Embodiments of the Present Disclosure

According to certain embodiments, a method for presenting one or more in-game objectives in one or more virtual games includes receiving first real-world telematics data associated with one or more prior first real-world vehicle trips made by a first real-world user and determining one or more first real-world driving characteristics based at least in part upon the first real-world telematics data. Also, the method includes receiving second real-world telematics data associated with one or more prior second real-world vehicle trips made by a second real-world user and determining one or more second real-world driving characteristics based at least in part upon the second real-world telematics data. The first real-world user is different from the second real-world user. Further, the method includes generating a shared virtual map based at least in part upon the one or more first real-world driving characteristics and the one or more second real-world driving characteristics. The method then includes processing information associated with the shared virtual map. Additionally, the method includes generating a shared in-game objective based at least in part upon the shared virtual map and presenting the shared in-game objective to a first virtual character and a second virtual character in a virtual game. The first virtual character is associated with the one or more first real-world driving characteristics of the first real-world user while the second virtual character is associated with the one or more second real-world driving characteristics of the second real-world user. The first virtual character and the second virtual character are different. Moreover, the method includes allowing the first virtual character and the second virtual character to accomplish, in the shared virtual map, the shared in-game objective. For example, the method is implemented according to at least FIG. 1A and/or FIG. 1B.

According to some embodiments, a computing device for presenting one or more in-game objectives in one or more virtual games includes one or more processors and a memory that stores instructions for execution by the one or more processors. The instructions, when executed, cause the one or more processors to receive first real-world telematics data associated with one or more prior first real-world vehicle trips made by a first real-world user and determine one or more first real-world driving characteristics based at least in part upon the first real-world telematics data. Also, the instructions, when executed, cause the one or more processors to receive second real-world telematics data associated with one or more prior second real-world vehicle trips made by a second real-world user and determine one or more second real-world driving characteristics based at least in part upon the second real-world telematics data. The first real-world user is different from the second real-world user. Further, the instructions, when executed, cause the one or more processors to generate a shared virtual map based at least in part upon the one or more first real-world driving characteristics and the one or more second real-world driving characteristics. The instructions, when executed, then cause the one or more processors to process information associated with the shared virtual map. Additionally, the instructions, when executed, then cause the one or more processors to generate a shared in-game objective based at least in part upon the shared virtual map and present the shared in-game objective to a first virtual character and a second virtual character in a virtual game. The first virtual character is associated with the one or more first real-world driving characteristics of the first real-world user while the second virtual character is associated with the one or more second real-world driving characteristics of the second real-world user. The first virtual character and the second virtual character are different. Moreover, the instructions, when executed, then cause the one or more processors to allow the first virtual character and the second virtual character to accomplish, in the shared virtual map, the shared in-game objective. For example, the computing device is implemented according to at least FIG. 3 and/or FIG. 4.

According to certain embodiments, a non-transitory computer-readable medium stores instructions for presenting one or more in-game objectives in one or more virtual games. The instructions are executed by one or more processors of a computing device. The non-transitory computer-readable medium includes instructions to receive first real-world telematics data associated with one or more prior first real-world vehicle trips made by a first real-world user and determine one or more first real-world driving characteristics based at least in part upon the first real-world telematics data. Also, the non-transitory computer-readable medium includes instructions to receive second real-world telematics data associated with one or more prior second real-world vehicle trips made by a second real-world user and determine one or more second real-world driving characteristics based at least in part upon the second real-world telematics data. The first real-world user is different from the second real-world user. Further, the non-transitory computer-readable medium includes instructions to generate a shared virtual map based at least in part upon the one or more first real-world driving characteristics and the one or more second real-world driving characteristics. The non-transitory computer-readable medium then includes instructions to process information associated with the shared virtual map. Additionally, the non-transitory computer-readable medium includes instructions to generate a shared in-game objective based at least in part upon the shared virtual map and present the shared in-game objective to a first virtual character and a second virtual character in a virtual game. The first virtual character is associated with the one or more first real-world driving characteristics of the first real-world user while the second virtual character is associated with the one or more second real-world driving characteristics of the second real-world user. The first virtual character and the second virtual character are different. Moreover, the non-transitory computer-readable medium includes instructions to allow the first virtual character and the second virtual character to accomplish, in the shared virtual map, the shared in-game objective. For example, the non-transitory computer-readable medium is implemented according to at least FIG. 1A, FIG. 1B, FIG. 3, and/or FIG. 4.

V. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VI. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A method for presenting shared objectives on a virtual map, the method comprising:
- determining, by a computing device, one or more first real-world driving characteristics based upon first real-world telematics data associated with one or more prior first real-world vehicle trips made by a first real-world user;
- determining, by the computing device, one or more second real-world driving characteristics based upon second real-world telematics data associated with one or more prior second real-world vehicle trips made by a second real-world user, the second real-world user being different from the first real-world user;
- generating, by the computing device, a shared virtual map based upon the one or more first real-world driving characteristics and the one or more second real-world driving characteristics;
- generating, by the computing device, a shared objective to be accomplished on the shared virtual map;
- transmitting for display on the computing device, the shared objective to a first virtual character and a second virtual character, the first virtual character being associated with the one or more first real-world driving characteristics of the first real-world user and the second virtual character being associated with the one or more second real-world driving characteristics of the second real-world user; and
- determining, by the computing device, whether the first virtual character and the second virtual character have accomplished the shared objective on the shared virtual map.

2. The method of claim 1, further comprising:
- processing, by the computing device, information associated with the shared virtual map.

3. The method of claim 1, wherein the determining, by the computing device, whether the first virtual character and the second virtual character have accomplished, on the shared virtual map, the shared objective includes:
- determining whether the first virtual character has satisfied, on the shared virtual map, one or more first virtual performance conditions; and
- determining whether the second virtual character has satisfied, on the shared virtual map, one or more second virtual performance conditions.

4. The method of claim 3, wherein the one or more first virtual performance conditions are equivalent to the one or more second virtual performance conditions.

5. The method of claim 3, wherein the one or more first virtual performance conditions are different from the one or more second virtual performance conditions.

6. The method of claim 3, wherein the determining, by the computing device, whether the first virtual character and the second virtual character have accomplished, on the shared virtual map, the shared objective further includes:
- if the one or more first virtual performance conditions have been determined to be not satisfied by the first virtual character, determining that the first virtual character and the second virtual character have not accomplished, on the shared virtual map, the shared objective.

7. The method of claim 5, wherein the determining, by the computing device, whether the first virtual character and the second virtual character have accomplished, on the shared virtual map, the shared objective further includes:
- if the one or more second virtual performance conditions have been determined to be not satisfied by the second virtual character, determining that the first virtual character and the second virtual character have not accomplished, on the shared virtual map, the shared objective.

8. The method of claim 3, wherein the determining, by the computing device, whether the first virtual character and the second virtual character have accomplished, on the shared virtual map, the shared objective further includes:
- if the one or more first virtual performance conditions have been determined to be satisfied by the first virtual character and the one or more second virtual performance conditions have been determined to be satisfied by the second virtual character, determining that the first virtual character and the second virtual character have accomplished, on the shared virtual map, the shared objective.

9. The method of claim 1, wherein the determining, by the computing device, whether the first virtual character and the second virtual character have accomplished, on the shared virtual map, the shared objective includes:
- determining whether the first virtual character and the second virtual character have, collectively, satisfied, on the shared virtual map, one or more virtual performance conditions.

10. The method of claim 9, wherein the determining, by the computing device, whether the first virtual character and the second virtual character have accomplished, on the shared virtual map, the shared objective further includes:
- if the one or more virtual performance conditions have been determined to be collectively satisfied by the first virtual character and the second virtual character, determining that the first virtual character and the second virtual character have accomplished, on the shared virtual map, the shared objective.

11. The method of claim 9, wherein the determining, by the computing device, whether the first virtual character and the second virtual character have accomplished, on the shared virtual map, the shared objective further includes:
- if the one or more virtual performance conditions have been determined to be not collectively satisfied by the first virtual character and the second virtual character, determining that the first virtual character and the second virtual character have not accomplished, on the shared virtual map, the shared objective.

12. A computing device for presenting one or more shared objectives on a virtual map, the computing device comprising:

one or more processors; and a memory storing instructions that, when executed by the one or more processors, cause the one or more processors to perform operations comprising:

determining one or more first real-world driving characteristics based at least in part upon first real-world telematics data associated with one or more prior first real-world vehicle trips made by a first real-world user;

determining one or more second real-world driving characteristics based at least in part upon second real-world telematics data associated with one or more prior second real-world vehicle trips made by a second real-world user, the second real-world user being different from the first real-world user;

generating a shared virtual map based at least in part upon the one or more first real-world driving characteristics and the one or more second real-world driving characteristics;

generating a shared objective to be accomplished on the shared virtual map;

transmitting for display on a computing device, the shared objective to a first virtual character and a second virtual character, the first virtual character being associated with the one or more first real-world driving characteristics of the first real-world user and the second virtual character being associated with the one or more second real-world driving characteristics of the second real-world user; and determining whether the first virtual character and the second virtual character have accomplished the shared objective on the shared virtual map.

13. The computing device of claim 12, wherein the operations further comprise:

processing information associated with the shared virtual map.

14. The computing device of claim 12, wherein determining whether the first virtual character and the second virtual character have accomplished, on the shared virtual map, the shared objective further comprises:

determining whether the first virtual character has satisfied, on the shared virtual map, one or more first virtual performance conditions; and determining whether the second virtual character has satisfied, on the shared virtual map, one or more second virtual performance conditions.

15. The computing device of claim 14, wherein the one or more first virtual performance conditions are different from the one or more second virtual performance conditions.

16. The computing device of claim 12, wherein the operations further comprise:

determining whether the first virtual character and the second virtual character have, collectively, satisfied, on the shared virtual map, one or more virtual performance conditions.

17. A non-transitory computer-readable medium storing instructions for presenting one or more shared objectives on a virtual map, the instructions when executed by one or more processors of a computing device, cause the computing device to perform operations comprising:

determining one or more first real-world driving characteristics based at least in part upon first real-world telematics data associated with one or more prior first real-world vehicle trips made by a first real-world user;

determining one or more second real-world driving characteristics based at least in part upon second real-world telematics data associated with one or more prior second real-world vehicle trips made by a second real-world user, the second real-world user being different from the first real-world user;

generating a shared virtual map based at least in part upon the one or more first real-world driving characteristics and the one or more second real-world driving characteristics;

generating a shared objective to be accomplished on the shared virtual map;

transmitting for display on s computing device, the shared objective to a first virtual character and a second virtual character, the first virtual character being associated with the one or more first real-world driving characteristics of the first real-world user and the second virtual character being associated with the one or more second real-world driving characteristics of the second real-world user; and determining whether the first virtual character and the second virtual character have accomplished the shared objective on the shared virtual map.

18. The non-transitory computer-readable medium of claim 17, wherein the operations further comprise:

processing information associated with the shared virtual map.

19. The non-transitory computer-readable medium of claim 18, wherein determining whether the first virtual character and the second virtual character have accomplished, on the shared virtual map, the shared objective comprises:

determining whether the first virtual character and the second virtual character have, collectively, satisfied, on the shared virtual map, one or more virtual performance conditions.

20. The non-transitory computer-readable medium of claim 17, wherein determining whether the first virtual character and the second virtual character have accomplished, on the shared virtual map, the shared objective comprises:

determining whether the first virtual character has satisfied, on the shared virtual map, one or more first virtual performance conditions; and determining whether the second virtual character has satisfied, on the shared virtual map, one or more second virtual performance conditions.

21. A computing system for presenting one or more shared objectives on a virtual map, comprising:

means for determining one or more first real-world driving characteristics based at least in part upon first real-world telematics data associated with one or more prior first real-world vehicle trips made by a first real-world user;

means for determining one or more second real-world driving characteristics based at least in part upon second real-world telematics data associated with one or more prior second real-world vehicle trips made by a second real-world user, the second real-world user being different from the first real-world user;

means for generating a shared virtual map based at least in part upon the one or more first real-world driving characteristics and the one or more second real-world driving characteristics;

means for generating a shared objective to be accomplished on the shared virtual map;

means for transmitting for display on a computing system, the shared objective to a first virtual character and a second virtual character, the first virtual character being associated with the one or more first real-world driving characteristics of the first real-world user and the second virtual character being associated with the one or more second real-world driving characteristics of the second real-world user; and means for determining whether the first virtual character and the second virtual character have accomplished the shared objective on the shared virtual map.

* * * * *